United States Patent
Modi et al.

(10) Patent No.: US 9,776,589 B2
(45) Date of Patent: Oct. 3, 2017

(54) VEHICLE CONTROL SYSTEM AND METHOD OF USING THE SAME

(71) Applicant: GM GLOBAL TECHNOLOGY OPERATIONS LLC, Detroit, MI (US)

(72) Inventors: Vipul A. Modi, Shelby Township, MI (US); John R. Dolan, Woodhaven, MI (US); James M. Churchwell, Milford, MI (US); Christian G. Ott, Langen (DE)

(73) Assignee: GM GLOBAL TECHNOLOGY OPERATIONS LLC, Detriot, MI (US)

( * ) Notice: Subject to any disclaimer, the term of this patent is extended or adjusted under 35 U.S.C. 154(b) by 561 days.

(21) Appl. No.: 14/315,715

(22) Filed: Jun. 26, 2014

(65) Prior Publication Data

US 2015/0375703 A1    Dec. 31, 2015

(51) Int. Cl.
*B60R 16/03* (2006.01)
*B60R 21/017* (2006.01)
*B60R 21/01* (2006.01)

(52) U.S. Cl.
CPC .......... *B60R 21/017* (2013.01); *B60R 16/03* (2013.01); *B60R 2021/01286* (2013.01)

(58) Field of Classification Search
CPC ............................. B60R 16/03; B60R 21/017
See application file for complete search history.

(56) References Cited

U.S. PATENT DOCUMENTS

| | | | | |
|---|---|---|---|---|
| 3,381,269 A * | 4/1968 | Fierbaugh | ................ | B60Q 9/00 340/456 |
| 5,170,066 A * | 12/1992 | Huber | ................... | B60R 21/017 180/274 |
| 6,209,910 B1 * | 4/2001 | Nagae | ................... | B60R 21/013 180/282 |
| 6,472,836 B1 * | 10/2002 | Uebelein | .............. | H02H 7/0851 318/434 |

(Continued)

FOREIGN PATENT DOCUMENTS

| AU | 2004203333 A1 | 2/2005 |
|---|---|---|
| DE | 19757137 A1 | 2/1999 |

(Continued)

OTHER PUBLICATIONS

German Office Action for Application No. 102015109817.2 dated Aug. 2, 2016, 8 Pages.

(Continued)

*Primary Examiner* — Thienvu Tran
*Assistant Examiner* — Pinping Sun
(74) *Attorney, Agent, or Firm* — Reising Ethington, P.C.

(57) ABSTRACT

A vehicle control system and a method for prolonging or extending the availability of certain safety-related features after an ignition unit has switched off or otherwise become inactive. The method can provide some safety-related features following an unintended ignition event, such as the type that can occur when the vehicle is involved in a multiple collision accident and the force of the initial impact unintentionally jars or switches the ignition unit off. In one (Continued)

example, the method uses a prolongation timer to temporarily power an airbag control module so that it is capable of sensing a crash and deploying an airbag for a period of time following the ignition being switched off.

14 Claims, 4 Drawing Sheets

(56) References Cited

U.S. PATENT DOCUMENTS

| | | | | |
|---|---|---|---|---|
| 7,733,228 | B2* | 6/2010 | Lee | B60N 2/002 |
| | | | | 280/734 |
| 8,113,988 | B2* | 2/2012 | Foster | B60K 6/445 |
| | | | | 477/125 |
| 2007/0299587 | A1* | 12/2007 | Breed | B60R 21/013 |
| | | | | 701/45 |
| 2012/0300598 | A1* | 11/2012 | Murray | G04G 13/02 |
| | | | | 368/251 |
| 2013/0106174 | A1* | 5/2013 | Uchida | F02N 11/0866 |
| | | | | 307/9.1 |
| 2014/0142812 | A1* | 5/2014 | Arai | G07C 5/085 |
| | | | | 701/45 |
| 2015/0048937 | A1* | 2/2015 | Horbatt | B60Q 9/00 |
| | | | | 340/457 |

FOREIGN PATENT DOCUMENTS

| | | | |
|---|---|---|---|
| DE | 10335908 A1 | 3/2005 | |
| DE | 102005009929 A1 * | 9/2006 | B60T 7/12 |
| DE | 102007006035 A1 * | 8/2008 | B60Q 1/44 |
| DE | 10109989 B4 | 4/2010 | |
| WO | WO0017982 A1 | 3/2000 | |

OTHER PUBLICATIONS

Panpan Xu, The Study of Vehicle Safety Airbag Control System based on Specific Power Ignition Algorithm, Chinese Master's Theses Full-Text Database, Jun. 2013, p. 27-28 (4 pages), Engineering Science and Technology II, China.

* cited by examiner

VEHICLE CONTROL SYSTEM AND METHOD OF USING THE SAME

FIELD

The present invention generally relates to a vehicle control system, and more particularly, a method for operating a vehicle control system following an unintended ignition event.

BACKGROUND

In some conventional vehicle control systems, certain safety-related features are only available when the ignition is in an 'on' or 'active' state or position. Thus, it may be beneficial to provide a system that prolongs or extends the availability of such features beyond the point of when the ignition is 'on', such as during the period following an unintended ignition event that unintentionally turns the ignition 'off' or 'inactive'.

SUMMARY

According to one embodiment, there is provided a method of using a vehicle control system with an ignition unit. The method may comprise the steps of: determining if an ignition status is inactive; determining if the vehicle is stationary; and when the ignition status is inactive and the vehicle is stationary, temporarily extending the availability of one or more safety-related features offered by the vehicle control system.

According to another embodiment, there is provided a method of using a vehicle control system with an ignition unit. The method may comprise the steps of: determining if an ignition status is inactive; determining if the vehicle is in motion; and when the ignition status is inactive and the vehicle is in motion, extending the availability of one or more safety-related features offered by the vehicle control system so long as the vehicle stays in motion.

According to another embodiment, there is provided a method of using a vehicle control system with an ignition unit. The method may comprise the steps of: determining if an ignition status is inactive; determining if the vehicle is stationary; and when the ignition status is inactive and the vehicle is stationary, using a prolongation timer to temporarily enable an airbag control module so that the airbag control module is capable of sensing a crash and deploying an airbag for a certain period of time after the ignition status becomes inactive.

DRAWINGS

Preferred exemplary embodiments will hereinafter be described in conjunction with the appended drawings, wherein like designations denote like elements, and wherein.

DESCRIPTION

The vehicle control system and method described herein can be used to prolong or extend the availability of certain safety-related features after an ignition unit has been switched 'off'. Thus, the system and method may provide some safety-related features following an unintended ignition event, such as the type that can occur when the vehicle is involved in a multiple collision accident and the force of the initial impact unintentionally jars or switches the ignition unit off. Of course, the aforementioned example only represents one of the possible circumstances that can potentially cause an unintended ignition event, as the system and method described herein could be used in response to any unintended ignition event and is not limited thereto.

Figure 1:
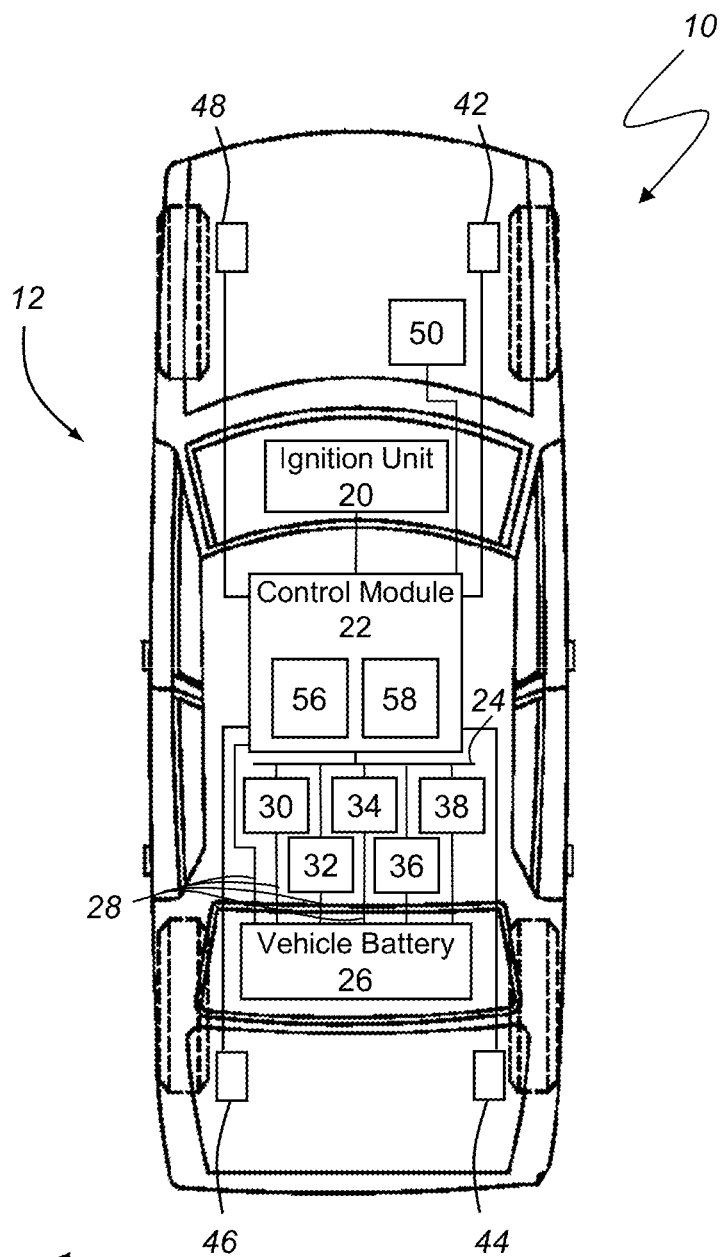
FIG. 1 is a schematic view of an exemplary vehicle with a vehicle control system installed therein.
Figure 2:
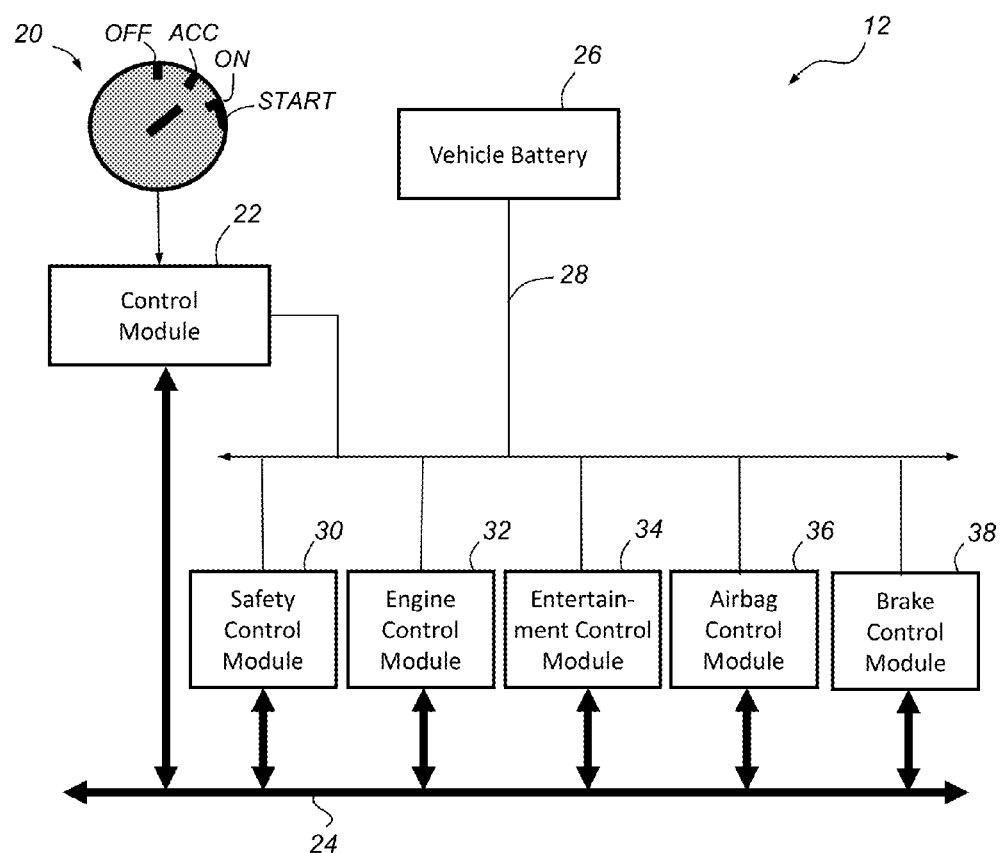
FIG. 2 is a schematic view of an exemplary vehicle control system that may be used in the vehicle of FIG. 1, wherein the vehicle control system is arranged according to a battery powered architecture.

With reference to FIGS. 1 and 2, there is shown a general and schematic view of an exemplary vehicle control system 12 installed on a vehicle 10. It should be noted that the following description is only one possibility, as the system and method described herein may be used with any type of vehicle and are not limited to the exemplary embodiments shown in FIGS. 1 and 2. For example, the system and method may be used with a wide variety of vehicles, including trucks, sports utility vehicles (SUVs), crossover vehicles and cars, as well as vehicles with traditional internal combustion engines, battery electric vehicles (BEVs), hybrid electric vehicles (HEVs), plug-in hybrid electric vehicles (PHEVs), extended-range electric vehicles (EREVs), keyed ignition systems and keyless ignition systems, to name a few. According to one example, vehicle 10 includes a vehicle control system 12 that may include an ignition unit 20, a control module 22, a communications bus 24, a vehicle battery 26, one or more additional control modules 30-38 and vehicle sensors 42-50. Of course, the aforementioned list of system items is merely exemplary, as the actual combination of components, devices, modules, systems, etc. can vary from this exemplary embodiment.

Figure 3:
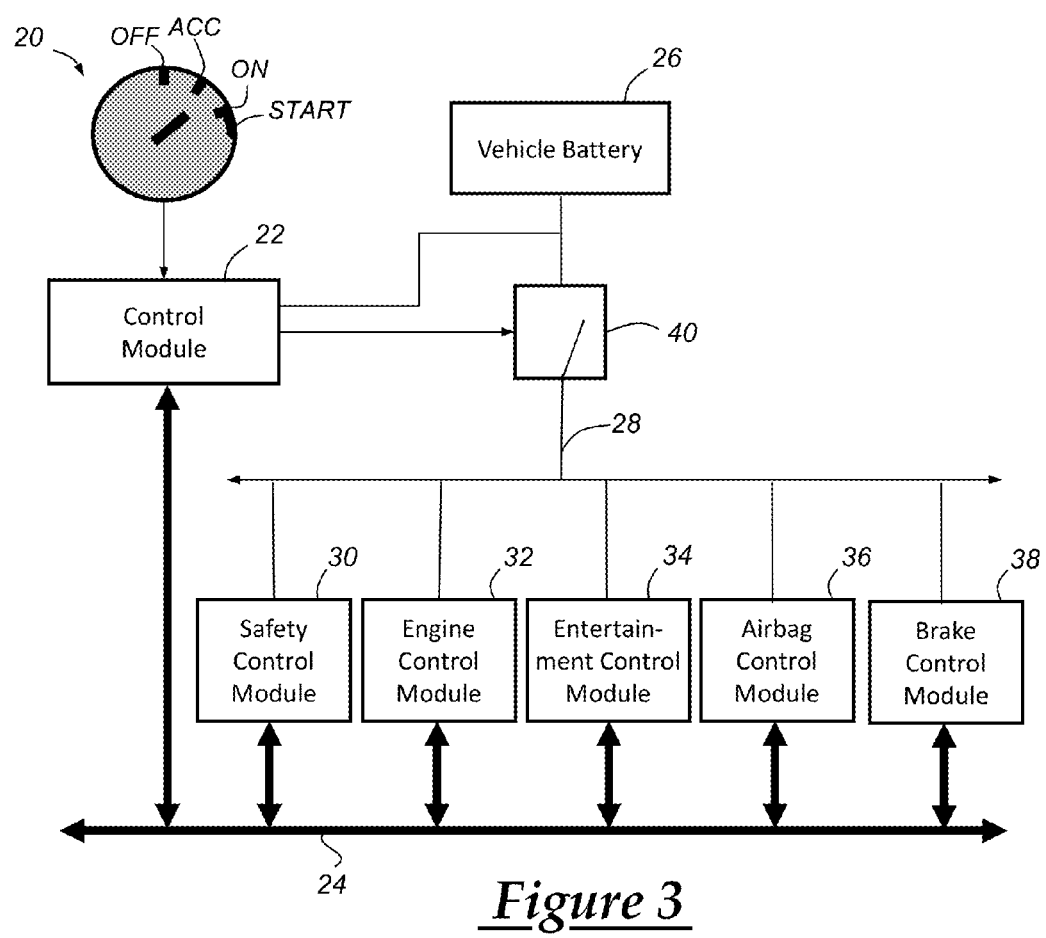
FIG. 3 is a schematic view of another exemplary vehicle control system that may be used in the vehicle of FIG. 1, wherein the vehicle control system is arranged according to an ignition powered architecture.

Before addressing the various components of the vehicle control system 12, the overall architecture or configuration of that system will be described. The vehicle control system 12 that is schematically shown in FIG. 2 is configured according to a 'battery powered architecture', as opposed to a more conventional 'ignition powered architecture' which is shown in FIG. 3. In a battery powered architecture or configuration, the various control modules (e.g., control modules 22 and 30-38) are directly or indirectly connected to vehicle battery 26 via connection 28, so that they receive electrical power from the battery without going through a relay or other type of switch that is connected to the ignition unit 20. In the ignition powered architecture of FIG. 3, the various control modules (e.g., control modules 30-38) are connected to the vehicle battery 26 through an ignition relay or other type of switch 40 and connection 28, while control module 22 (e.g., a body control module) is powered by the battery directly without going through the relay. One difference between these two types of architectures is that when an ignition unit 20 is off or inactive in a battery powered system, the various control modules 30-38 may still be provided with electrical power and, thus, may still operate. In an ignition powered system, when the ignition unit 20 is off or inactive, the control modules 30-38 that are powered through relay or switch 40 will not be provided with electrical power if the switch is open and, in those circumstances, will not operate. If the present method is carried out in the context of an ignition powered architecture, then some or all of the corresponding electronic instructions or software needed to carry out the method may need to be maintained and/or processed at the control module 22, since it is the only module in FIG. 3 to still have power availability after the relay 40 is opened. The following description is generally provided in the context of the battery powered architecture of FIG. 2, but the present method may be used in the context of a battery powered architecture, an ignition powered architecture, or some other type of suitable module architecture or arrangement and is not limited to any particular type.

Ignition unit 20 activates the main electrical systems for the vehicle and may be used with keyed or keyless ignition systems. The exemplary ignition unit 20, as depicted in FIGS. 1 and 2, is part of a keyed ignition system and includes an ignition switch with several different ignition switch positions. In keyed ignition systems, the ignition unit 20 typically requires a key (not shown) to unlock a switch mechanism in an ignition lock cylinder, and is often coupled with a starter switch for activating a starter motor. The exemplary ignition unit 20 generally has four positions: an 'off' position, an accessory or 'acc' position, an 'on' or run position, and a 'start' or crank position; these positions may vary and need not have the same combination or be in the particular order shown in FIG. 2. For example, it may be possible for the 'off' position to be located between the 'acc' position and the 'on' position, there may be no accessory position all together, or there may be additional positions such as a lock position.

For ease of explanation, the term 'inactive' will be used to broadly refer to any ignition position where the main vehicle propulsion system is not activated. In the case of vehicles having a traditional internal combustion engine as the main propulsion source, the term 'inactive' refers to an ignition position where a starter has not yet started the internal combustion engine (in the FIG. 2 example, inactive includes the 'off' and the 'acc' positions). In terms of battery electric vehicles (BEVs), hybrid electric vehicles (HEVs), plug-in hybrid electric vehicles (PHEVs), extended range electric vehicles (EREVs), or any other vehicles that primarily use an electric motor as the main source of propulsion, the term 'inactive' refers to an ignition position where the main electrical contactors in the vehicle are open or have not been energized. Conversely, the term 'active' broadly refers to any ignition position where the main vehicle propulsion system is activated. In the context of vehicles with traditional internal combustion engines as the main source of propulsion, the term 'active' refers to an ignition position where a starter has already started the internal combustion engine or is in the process of starting the engine (in FIG. 2, active includes the 'on' and the 'start' positions). For BEVs, HEVs, PHEVs, EREVs or any other vehicles that primarily use an electric propulsion system, the term 'active' refers to all ignition positions where the main electrical contactors are closed or have been energized.

As mentioned above, the present system and method may also be used with keyless ignition systems, which oftentimes include a hand-held fob containing a radio transceiver that communicates with a transceiver on the vehicle. According to one exemplary embodiment, when the transceiver on the vehicle detects an authorized fob within a certain predetermined zone, the driver may start the vehicle by simply activating the ignition starter, such as by pressing a button. Other examples and embodiments of keyed and keyless ignition systems, including those using remote start features, may also be used. The present description is provided in the context of a keyed ignition system for a traditional internal combustion engine, however, it should be appreciated that the system and method described herein are not so limited and may easily be used with other systems and in other applications as well.

Control module 22 is coupled to the ignition unit 20 and may be used to determine the status of the ignition unit and to forward the ignition status to various components, devices, systems, etc. over the communications bus 24. For example, if the control module 22 determines that the ignition unit 20 is inactive (e.g., the ignition position is either off or acc), then the control module 22 may send out a message on the communications bus 24 alerting the various control modules 30-38, as well as other modules, of the inactive ignition status. Conversely, when the control module 22 determines that the ignition unit 20 is currently active (e.g., the ignition position is either on or start), then the control module can send a message over the communications bus 24 informing the various control modules that the vehicle ignition is currently active or on. Because each of the control modules 30-38 are powered by vehicle battery 26 independently of the ignition unit 20 (i.e., battery powered architecture), each module may use the ignition status as provided by the control module 22 to determine when it should be powered up and operating versus when it should be powered off. For example, if ignition unit 20 is in the 'acc' or accessory position, control module 22 may send out a message via the communications bus 24 relaying the ignition status of the ignition unit to the various control modules 30-38. The entertainment or infotainment control module 34 may use that ignition status to determine that it should be operational during an accessory mode and, thus, enable the vehicle battery 26 to power module 34 during this period. The engine control module 32, on the other hand, may determine that it is best to conserve battery power during an accessory mode and could prevent the vehicle battery 26 from powering module 32 during this period. In the exemplary battery powered architecture or configuration of the vehicle control system 12, the control module 22 is able to send out or otherwise convey the ignition status of the ignition unit 20 so that each control module 30-38 can independently determine if it should be powered up and operating; this may be true even when the ignition status is inactive. It is also possible for control module 22 to transmit the ignition status, as well as other messages and information, to other components in the vehicle, such as intermediary control modules or a battery control module, for example.

Control module 22 may include any variety of electronic processing devices, memory devices, input/output (I/O) devices, and/or other known components, and may perform various control and/or communication related functions. In an exemplary embodiment, control module 22 includes an electronic memory device 56, an electronic processing device 58, and a timer. The electronic memory device 56 can store various sensor readings (e.g., sensor readings from sensors 42-50), look up tables or other data structures, algorithms (e.g., the algorithm that embodies or performs the exemplary method described below), etc. Memory device 56 may also store pertinent characteristics and background information pertaining to vehicle 10, such as information relating to driver behavioral or historical data, previous ignition unit transition data, prior accident or crash related data, etc. Control module 22 may also include an electronic processing device 58 (e.g., a microprocessor, a microcontroller, an application specific integrated circuit (ASIC), etc.) that executes instructions for software, firmware, programs, algorithms, scripts, applications, etc. that are stored in memory device 56 and may govern the methods described herein. The timer may be embodied in hardware, software or a combination thereof and, according to one embodiment, is a prolongation timer used by the present method, as will be described. Control module 22 may be electronically connected to other vehicle devices, modules, and systems via suitable vehicle communications, like communications bus 24, and can interact with them when required. These are, of course, only some of the possible arrangements, functions and capabilities of control module 22, as other embodiments could also be used.

Depending on the particular embodiment, control module 22 may be a stand-alone vehicle electronic module (e.g., a power master ECU, an airbag control module, an ignition control module, etc.), it may be incorporated or included within another vehicle electronic module (e.g., a body control module, engine control module, etc.), or it may be part of a larger network or system (e.g., an active safety system, an engine management system, etc.), to name a few possibilities. Accordingly, control module 22 is not limited to any one particular embodiment or arrangement and may be used to perform or carry out one or more aspects of the present method.

Control modules 30-38 may include any combination of control modules or units commonly found on a vehicle, including a safety control module 30, an engine control module 32, an entertainment control module 34, an airbag control module 36, brake control module 38, etc. These control modules may include a variety of different components and/or be part of a number of different vehicle systems, and they may be capable of diverse functionality, including crash sensing capabilities. Safety control module 30 may be configured and designed with various crash or collision sensing, avoidance and/or mitigation type features. Some non-limiting examples of such features include: collision warning, lane departure warning, autonomous or semi-autonomous braking, autonomous or semi-autonomous steering, airbag deployment, active crumple zones, seat belt pre-tensioners or load limiters, and automatic notification to emergency responders in the event of a crash, to name a few. Of course, other safety features may be included as well. Safety control module 30 may be a stand-alone module or component or it may be part of a larger module or system that includes other components, such as an airbag control unit, a traction control unit, an anti-lock brake control unit, a stability control unit or some combination thereof. According to one embodiment, the safety control module 30 includes the airbag control module 36. Skilled artisans will appreciate that the engine control module 32, the entertainment control module 34, the airbag control module 36 and/or the brake control module 38 can be provided according to any suitable embodiment known in the art.

Vehicle sensors 42-50 may provide vehicle control system 12 with information, data and/or other input that can be used by the present method. These include, for example, the exemplary sensors shown in FIG. 1, as well as other sensors that are known in the art but are not shown here. It should be appreciated that vehicle sensors 42-50, as well as any other sensor that is a part of and/or is used by system 12 may be embodied in hardware, software, firmware or some combination thereof. These sensors may directly sense or measure the conditions for which they are provided, or they may indirectly evaluate such conditions based on information provided by other sensors, components, devices, modules, systems, etc. Furthermore, sensors 42-50 may be directly coupled to the various control modules, indirectly coupled via other electronic device, or coupled according to some other arrangement known in the art. These sensors may be integrated within another vehicle component, device, module, system, etc. (e.g., sensors that are already part of an engine control module, traction control system, electronic stability control system, antilock brake system, etc.), they may be stand-alone components (as schematically shown in FIG. 1), or they may be provided according to some other arrangement. In some instances, multiple sensors might be employed to sense a single parameter (e.g., for providing redundancy). It should be appreciated that the foregoing scenarios represent only some of the possibilities, as system 12 is not limited to any particular sensor or sensor arrangement and any suitable embodiment may be used.

Vehicle sensors 42-48 are speed sensors and generate readings that represent the position, velocity and/or acceleration of the vehicle 10, while vehicle sensor 50 is a vehicle dynamics sensor and provides readings the represent vehicle dynamics such as lateral acceleration, yaw rate, etc. Speed sensors 42-48 may utilize a variety of different sensors and sensing techniques, including those that use rotational wheel speed, ground speed, accelerator pedal position, gear position, shift lever position, accelerometers, engine speed, engine output, and throttle valve position, to name a few. Such information may similarly be available through engine control module 32. In the example shown in FIG. 1, individual speed sensors 42-48 are coupled to each of the vehicle's four wheels and separately report the rotational velocity of the four wheels. Vehicle dynamics sensor 50 can be mounted under one of the front seats or at any other suitable location within vehicle 10 so that it can sense lateral acceleration, yaw rate and other pertinent vehicle dynamics. Skilled artisans will appreciate that these sensors may operate according to optical, electromagnetic or other technologies, and that other parameters may be derived or calculated from the velocity readings, such as longitudinal or lateral accelerations. In another embodiment, vehicle sensors 42-48 determine vehicle speed relative to the ground by directing radar, laser and/or other signals towards known stationary objects and analyzing the reflected signals, or by employing feedback from a navigational unit that has Global Positioning System (GPS) and/or telematics capabilities. Vehicle sensors 42-50 may directly or indirectly send information to any of the control modules 30-38 in the vehicle 10, including control module 22.

Again, the preceding description of exemplary vehicle control system 12 and the drawings in FIGS. 1 and 2 are only intended to illustrate one potential embodiment, and the following method is not confined to use with only that system. Any number of other system arrangements, combinations and architectures, including the system shown in FIG. 3 that is arranged according to an ignition powered architecture and is described above, as well as others that differ significantly from the ones disclosed herein, may be used instead.

Figure 4:
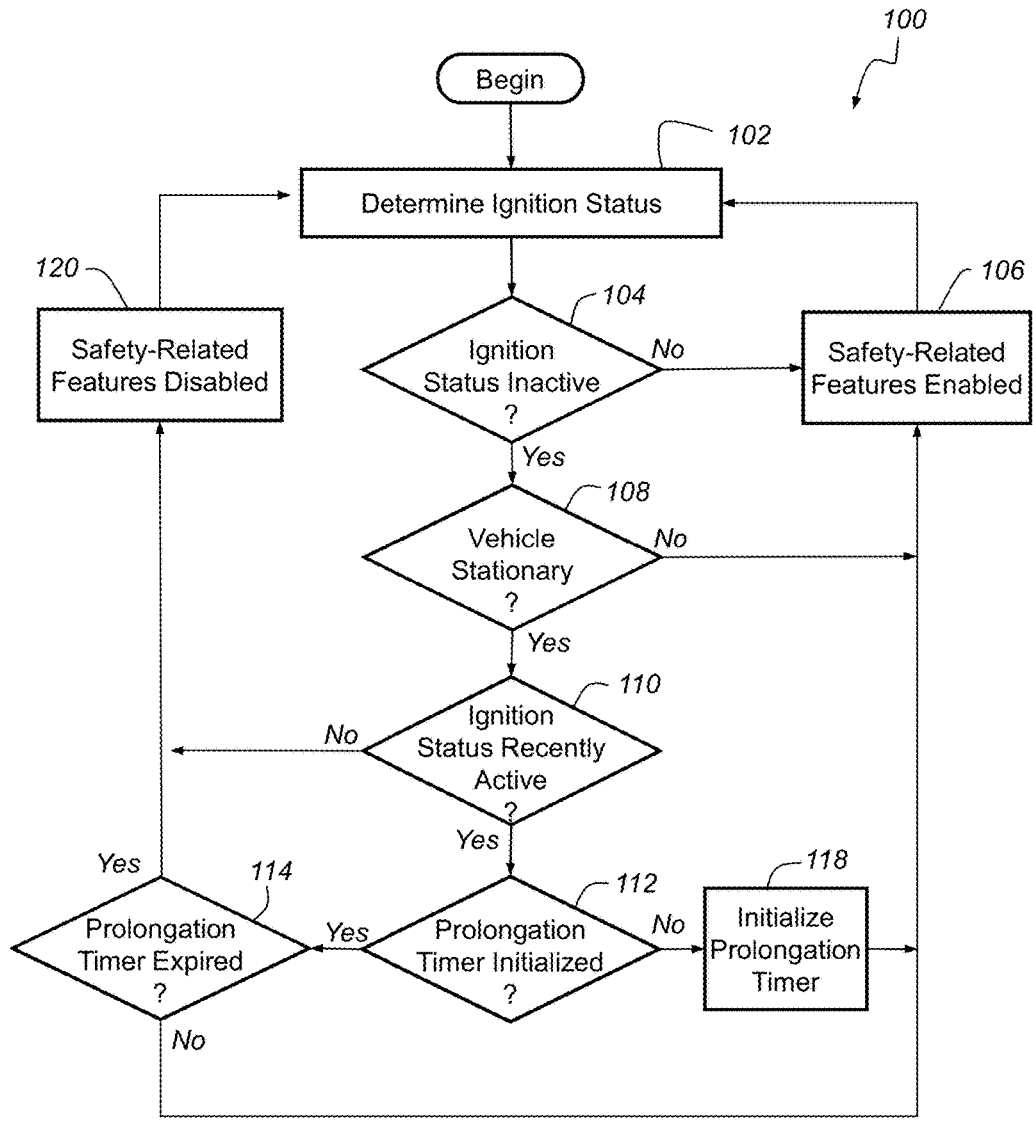
FIG. 4 is a flowchart of an exemplary method for operating the vehicle control system of FIGS. 1 and 2.

Turning now to FIG. 4, there is shown an exemplary method 100 that may be used with vehicle control system 12 to prolong or extend the availability of certain safety-related features beyond the point when the ignition unit turns off or otherwise becomes inactive, such as during the period following an unintended ignition event. In some conventional systems, many of the control modules in the vehicle would lose power once the ignition status became inactive. Consider the example where the vehicle 10 is being driven at a high rate of speed in an off-road environment and the ignition unit 20 is jarred so that the ignition status changes from active to inactive, even though the vehicle is still in motion. The present method may be used to extend the availability of some safety-related features that would have potentially been unavailable in a conventional system once the ignition status became inactive. In another example, the vehicle 10 is involved in a collision where the force of an initial impact jolts or disrupts the ignition unit 20 and causes the ignition status to change from active to inactive. In this case, the present method may again be used to prolong or extend the availability of certain features, such as airbags or other safety-related features, which can be beneficial if the vehicle is subsequently involved in a follow-on collision (i.e., a multiple collision scenario). The preceding examples are not the only sets of circumstances where a vehicle may experience an unintended ignition event, as others are anticipated as well.

Beginning with step 102, the method determines an ignition status and may do so in any number of different ways. For example, it is possible for the control module 22 to query or otherwise obtain the present state of the ignition unit 20 in order to determine the current ignition status. In a different embodiment, the control module 22 or some other device may detect a change in ignition status and, in response to the change, determine if the ignition status is active or inactive. This may be performed in terms of the actual ignition position of the ignition unit 20 (e.g., OFF, ACC, ON, START) or it may be performed in terms of whether or not the ignition unit is active or inactive. As mentioned above, in terms of a vehicle with a standard internal combustion engine and a keyed ignition, the ignition positions OFF and ACC are considered 'inactive' and the ignition positions ON and START are considered 'active'. In a keyless system, there may only be two different ignition statuses or states: active and inactive, as most keyless systems do not have ACC and START ignition positions. It should be appreciated that any suitable method or technique may be used to determine or obtain the ignition status, including the exemplary ways mentioned above as well as other ways that are used with keyless systems, EVs, HEVs, PHEVs, EREVs, other vehicles with electric propulsion systems, and remote starters, to name a few. It is possible for control module 22 to retain the ignition status information gathered from the ignition unit 20 or to pass it along to one or more other control modules via communications bus 24.

In step 104, the method proceeds according to different paths based on whether the ignition status is active or inactive, as defined above. If the ignition status is active (e.g., ignition is in ON or START position), then the method continues to step 106 where certain crash sensing or other safety-related features can be enabled, such as those provided by safety control module 30, airbag control module 36, brake control module 38, or some other module or combination of modules. According to one example, step 106 powers or otherwise enables airbag control module 36 so that it is able to sense or detect crashes and deploy one or more airbags accordingly. Step 106 may also power and enable other devices, modules, systems, algorithms, etc., in the vehicle, like safety control module 30, brake control module 38 and/or a steering control module, to name but a few of the possibilities. In the event that the safety-related features in question are disabled when the method encounters step 106, that step could enable them or otherwise turn them on; if the safety-related features are already enabled, then step 106 could simply maintain their enabled state. The terms "enable" and "enabled," as used in the context of safety-related features, broadly refer to an operational state or condition of a vehicle device, module and/or system where such an apparatus is able to provide one or more safety-related features. In some instances, being enabled refers to when a vehicle device, module and/or system is both supplied with power and has authorization by the system to operate, such as by providing safety-related features. For example, when any one of safety control module 30, airbag control module 36 or brake control module 38 is enabled, it means that the module is powered and ready to provide certain safety-related features or perform certain functions.

Following step 106, the method returns to step 102 for continued monitoring of the ignition status. In some conventional architectures, the operational state of a control module like the safety control module 30, airbag control module 36, brake control module 38, etc. is generally dependent on the ignition status so that when the ignition status is active the corresponding control module is typically active, and when the ignition status is inactive the control module is usually inactive or disabled so that certain safety-related features are not available. The present method is designed to at least partially address this situation, as described below in more detail. If at step 104, the method determines that the ignition status is inactive or off, then the method proceeds to step 108, as there still may be a reason to keep certain features of the vehicle enabled even though the ignition unit has been switched off (e.g., the off-road example above).

Step 108 determines if the vehicle is in motion or is stationary. If the vehicle is still in motion, even though the ignition status is inactive, it may indicate that there has been an unintended ignition event where the ignition status has been accidentally switched from active to inactive. The aforementioned off-road scenario is an example where the ignition status could unintentionally by jarred or jolted into an inactive state, even though the vehicle is still in motion. In typical intentional ignition events, the driver brings the vehicle to a stop so that it is no longer moving before they put it in park and turn off the ignition. Thus, step 108 is designed to help identify those instances where an unintended ignition event has likely occurred and the ignition status has mistakenly been made inactive. If step 108 determines that the vehicle is still in motion, then the method may conclude that crash sensing is still needed and may continue to step 106 so that the various crash-sensing and/or other safety-related features can be maintained in an enabled state, as described above. This process may continue until the vehicle comes to a stop and/or when the crash sensing features are no longer needed. If, however, step 106 determines that the vehicle is stationary, then the method proceeds to step 110 for further processing, as there could still be grounds to keep some features enabled even though the ignition unit has been switched off and the vehicle is no longer in motion (e.g., the multiple collision example above).

Skilled artisans will appreciate that numerous factors and inputs may be used to determine if the vehicle is stationary or is in motion. For example, vehicle speed, vehicle acceleration, wheel speed, wheel acceleration, inertial sensor information, GPS information, brake system information, as well as any other input or information pertaining to vehicle dynamics. In addition, the present method may use readings or information pertaining to various parts of the vehicle drivetrain to determine if the vehicle is stationary or in motion; these may include, for example, gear or shift lever position, engine speed, gear or shaft rotation, as well as any other input from the vehicle drivetrain indicating that the vehicle is stopped or moving. In the embodiment of FIG. 1, wheel speed sensors 42-48 send speed signals to control module 22, which can interpret them and determine if the vehicle 10 is currently moving or stationary. In another embodiment, step 108 may obtain a speed reading from engine control module 32 in order to determine the dynamic status of the vehicle. If the engine control module 32 becomes disabled after the ignition becomes inactive or turns off, the method may use the last saved speed reading prior to being turned off and may verify the last speed reading with a time stamp. For any piece of data or information that is obtained from a module that becomes disabled when the ignition is inactive, it may be beneficial to verify the last reading obtained with a time stamp. In contrast, the brake control module 38 typically remains operable or enabled despite an inactive ignition status, so step 108 may include taking readings from an anti-lock brake system or some other part of the brake control module.

Of course, it is not necessary for step 108 to conclude that the vehicle is at a complete or total standstill in order to determine that it is stationary. It is possible for the method to use some type of speed threshold (e.g., 1, 3 or 5 mph or the like), where the method will conclude that the vehicle is stationary if its speed is less than or equal to the speed threshold. Step 108 can be designed in such a way as to only use one input (e.g., vehicle speed) or multiple inputs (e.g., all obtainable information relating to vehicle position and/or transmission state) before determining if the vehicle is stationary. If multiple inputs are used to determine if there is a potential that the vehicle is in motion, it may be desirable to implement a process to arbitrate or otherwise resolve conflicts between inputs. Such a process may include weighing certain inputs over others. Those skilled in the art will appreciate that any suitable technique or process for determining if the vehicle is in motion versus if it is stationary may be employed, including those described above as well as others, and that the present method is not limited to any particular one.

Step 110 determines if the ignition status has recently changed or switched from an active ignition status to an inactive ignition status. Step 110, which is optional, helps confirm or corroborate that an unintended ignition event has occurred that warrants the temporary extension or prolongation of certain safety-related features. Consider the example where the ignition status is inactive or off, the vehicle is parked and stationary, and someone in the vehicle cabin reaches for an item and inadvertently knocks or jars the ignition unit 20 so that the ignition status mistakenly changes from OFF to ACC, which is still an "inactive" ignition position. In this scenario, it may be possible for the method 100 to mistakenly interpret the circumstances for an unintended ignition event that justifies enabling one or more safety-related features, when actually there is no need to enable such features. Thus, step 110 may look to the last or previous ignition position, which could be stored in control module 22 for example, and determine whether or not the ignition unit was transitioning from an active state to an inactive one which suggests the potential need for safety-related features, or simply transitioning between inactive states (as in the preceding example) such that certain safety-related features are probably not necessary. Put differently, step 110 may be used to identify ignition status transitions or changes within inactive states (e.g., from OFF to ACC, from ACC to OFF, etc.). If the ignition status did not recently change from an active ignition status, then the method may proceed to step 120 so that certain safety-related features are disabled or maintained in a disabled state; whereas if the ignition status did recently switch from an active ignition status, then the method could continue to step 112 for temporarily extending or prolonging the availability of one or more safety-related features.

It should be appreciated that the method may include additional or different steps, other than steps 104, 108 and 110, for establishing when an unintended ignition event has occurred and when safety-related features may be needed. In one sense, the steps 104, 108 and 110 are being used to identify situations where the vehicle ignition is inactive or off, the vehicle is generally stopped, but because of the circumstances there may be a need to keep one or more safety-related features, like the vehicle airbags, temporarily enabled. Thus, any other inquiries or steps that further the objective of identifying such situations may also be employed. Once such example involves determining the current shift position or gear setting of the transmission; if the ignition status is off or inactive, but the shift lever position is still in drive, then this could further indicate that an unintended ignition event has occurred and that certain safety-related features should remain enabled. Another example involves the use of door sensors, occupant sensors in the seats and/or any other sensors that may determine if one or more occupants are still in the vehicle. If these different sensors indicate that the occupants have left the vehicle, then the method may transition to step 120 to disable certain safety-related features; if these sensors indicate that one or more occupants are still inside the vehicle, then the method may proceed to step 110. Again, other inquiries or steps could also be used.

Next, the method continues to step 112 to determine whether a prolongation timer has been initialized. A prolongation timer, as used herein, is simply a timer that sets the duration or amount of time for which availability of one or more safety-related features will be temporarily prolonged or extended. In terms of the exemplary vehicle control system 12, this could mean that a prolongation timer is set so that certain control modules (e.g., control module 22, safety control module 30, airbag control module 36, brake control module 38, some other module or device and/or some combination thereof) are powered and enabled for some time after the ignition system is turned off or otherwise becomes inactive. As previously explained, in an ignition powered architecture these various control modules may not have power from the battery after the ignition has been turned off. The prolongation timer can keep power flowing from battery 26 to one or more of the control modules 22, 30-38 for a certain period of time so that those control modules can provide certain safety-related features. In one embodiment, the method 100 cycles at a rate fast enough that the prolongation timer is started contemporaneously with the ignition unit becoming inactive and the vehicle stopping. It should be appreciated that a number of factors or parameters may be taken into account when establishing the length or duration of the prolongation timer, and that such a duration can be a static predetermined amount of time or a changing dynamic one.

One factor that can affect the duration of the prolongation timer pertains to a reset function found on many control modules within the vehicle. For example, if a driver turns the vehicle ignition off and then quickly thereafter turns the ignition back on (i.e., goes from active to inactive, then from inactive to active), there is oftentimes a reset time where the control module must go through some type of close-down and/or start-up routine. For crash sensors and other diagnostics, the reset time is typically in the range of 3-5 seconds. By initializing the prolongation timer as soon as the ignition unit becomes inactive and by setting it sufficiently long (e.g., 3-5 seconds or more), the present method may be able to continue powering select control modules during these routines so that the control module does not lose power and become disabled.

Another factor to consider pertains to the typical temporal separation or spacing between collisions in a multiple collision scenario. For example, the great majority of subsequent collisions in a multiple collision scenario occur within the first 5 seconds following an initial impact, thus, by setting a prolongation timer to be at least 5 seconds long, the safety-related features or crash algorithms in question can be enabled during this period where most follow on accidents occur. According to one embodiment, the prolongation timer uses a static time period and is set for 3-10 seconds, but other timer durations may be used instead.

It should be appreciated that an unnecessarily extended or long prolongation timer may be undesirable. For example, in the context of the airbag control module 36, having a prolongation timer that is too long (e.g., 1 hour) could result in increased service times, as mechanics and other service technicians must wait until the airbags are inactive before beginning service on the vehicle. As mentioned above, instead of a static or predetermined timer period, it is also possible to have a dynamic period. A dynamic delay period may be based on the different inputs received that suggest the occurrence of an unintended ignition event. For example, if steps 108 and 110 strongly suggest that the ignition status was unintentionally switched to an inactive state and that the vehicle still needed certain safety-related features, like the vehicle airbags, then a longer timer duration may be used in order to further extend the availability of the airbags. In another example, the dynamic delay period may be combined with a static delay period so that there is a baseline or minimum static prolongation delay period followed by an optional dynamic prolongation delay period that is based on one or more inputs, as just described.

If step 112 determines that the prolongation timer has already been initialized, then step 114 determines if the prolongation timer has expired. If the timer has not expired and is still running, the method returns to step 106 so that the various safety-related features can remain enabled. If, however, the prolongation timer has expired, then the method concludes that the period following a potential unintended ignition event has generally finished and it proceeds to step 120 where the safety-related features in question can be disabled or maintained in a disabled state. It is possible for step 114 or some additional step to determine if any occupants are still present in the vehicle (e.g., using door sensors, occupant sensors in the seats and/or other suitable sensors, as described above) before disabling the safety-related features at step 120. If, for example, it appears that one or more occupants are still present, then the method may want to further extend the prolongation timer or even keep the safety-related features enabled until the occupants have vacated the vehicle (i.e., override the current prolongation timer). If the vehicle appears empty and the prolongation timer has expired at step 114, then the method may proceed to step 120. In a different embodiment, the prolongation timer could even be replaced with a one or more non-temporal criteria, like the occupant sensing criteria above. For instance, instead of temporarily extending the availability of the safety-related features strictly on a temporal or time basis, the safety-related features could continue to be made available so long as certain criteria (e.g., the presence of one or more occupants) is met. The preceding examples are only optional and are certainly not required for method 100.

In the event that step 112 determines that the prolongation timer has not yet been initialized (e.g., during the first cycle of the method where the ignition is inactive, the vehicle is stationary and the ignition was recently active), then step 118 initiates or otherwise starts the timer.

It should be understood that method 100 is merely an illustration of one exemplary embodiment, and that other embodiments with different sequences and combinations of steps, as well as ones with different logic flows may be used instead. The above-described method may be used with both keyed and keyless ignition units and may affect a variety of vehicle safety features. The method may be performed or executed wholly or partially within a number of different modules (e.g., the control module 22, the safety control module 30, airbag control module 38, a body control module or some other module) and may impact numerous vehicle systems, such as an active safety system, a brake or steering control system, or a stability control system, to name a few.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of using a vehicle control system with an ignition unit, comprising the steps of:
    detecting an unintentional ignition event where an ignition state of the vehicle unintentionally changes from active to inactive;
    determining if the vehicle is stationary;
    when the vehicle is stationary and in response to the detection of the unintentional ignition event, initializing a prolongation timer and temporarily extending the availability of one or more safety-related features offered by the vehicle control system, wherein the one or more safety-related features offered by the vehicle include crash sensing functionality;
    detecting that the prolongation timer has expired; and
    in response to the detection that the prolongation timer has expired, terminating the availability of the one or more safety-related features offered by the vehicle control system.

2. The method of claim 1, wherein the step of detecting an unintentional ignition event further comprises determining an ignition position of an ignition unit, and then determining if the ignition position corresponds to an active ignition status or an inactive ignition status.

3. The method of claim 1, wherein the step of detecting an unintentional ignition event further comprises detecting a change in an ignition status, and then determining if the ignition status after the change corresponds to an active ignition status or an inactive ignition status.

4. The method of claim 1, wherein the step of determining if the vehicle is stationary further comprises comparing a vehicle speed reading to a speed threshold and concluding that the vehicle is stationary when the vehicle speed reading is less than the speed threshold.

5. The method of claim 1, wherein the prolongation timer uses a predetermined static duration that is between about 3 and 10 seconds.

6. The method of claim 1, wherein the prolongation timer uses a dynamic duration that is based on one or more inputs.

7. The method of claim 1, wherein the step of temporarily extending the availability of one or more safety-related features further comprises powering one or more control modules within the vehicle so that the control modules are capable of providing the safety-related features for a certain period of time after the ignition status becomes inactive.

8. The method of claim 7, wherein the step of temporarily extending the availability of one or more safety-related features further comprises powering an airbag control module so that the airbag control module is capable of sensing a crash and deploying an airbag for a certain period of time after the ignition status becomes inactive.

9. The method of claim 1, further comprises the step of: enabling one or more safety-related features or maintaining one or more safety-related features in an enabled state without a prolongation timer when it is determined that the ignition status is active.

10. The method of claim 1, further comprises the step of: enabling one or more safety-related features or maintaining one or more safety-related features in an enabled state without a prolongation timer when it is determined that the ignition status is inactive and the vehicle is in motion.

11. The method of claim 1, further comprises the step of: enabling one or more safety-related features or maintaining one or more safety-related features in an enabled state when it is determined that the ignition status is inactive, the vehicle in stationary, and the shift lever position is in drive.

12. The method of claim 1, further comprises the step of: enabling one or more safety-related features or maintaining one or more safety-related features in an enabled state when it is determined that the ignition status is inactive, the vehicle in stationary, and a sensor indicates that there are one or more occupants in the vehicle.

13. The method of claim 1, further comprises the step of: disabling one or more safety-related features or maintaining one or more safety-related features in a disabled state when it is determined that the ignition status is inactive, the vehicle in stationary, and a prolongation timer has expired.

14. A method of using a vehicle control system with an ignition unit, comprising the steps of:
determining if an ignition status is inactive due to an unintentional ignition event where an ignition state of the vehicle unintentionally changes from active to inactive;
determining if the vehicle is stationary; and
when the ignition status is inactive due to the unintentional ignition event and the vehicle is stationary, using a prolongation timer to temporarily enable an airbag control module so that the airbag control module is capable of sensing a crash and deploying an airbag for a certain period of time after the ignition status becomes inactive.

* * * * *